(12) United States Patent
Liu et al.

(10) Patent No.: US 12,241,179 B2
(45) Date of Patent: Mar. 4, 2025

(54) HIGH-WHITENESS POLYIMIDE MICROFIBER AND PREPARATION METHOD THEREOF AND USE

(71) Applicant: China University of Geosciences (Beijing), Beijing (CN)

(72) Inventors: Jingang Liu, Beijing (CN); Xinxin Zhi, Beijing (CN); Yan Zhang, Beijing (CN); Chenyu Guo, Beijing (CN); Lin Wu, Beijing (CN); Xiao Wu, Beijing (CN)

(73) Assignee: China University of Geosciences (Beijing), Beijing (CN)

( * ) Notice: Subject to any disclaimer, the term of this patent is extended or adjusted under 35 U.S.C. 154(b) by 134 days.

(21) Appl. No.: 17/617,522

(22) PCT Filed: Apr. 29, 2021

(86) PCT No.: PCT/CN2021/090829
§ 371 (c)(1),
(2) Date: Dec. 8, 2021

(87) PCT Pub. No.: WO2021/219055
PCT Pub. Date: Nov. 4, 2021

(65) Prior Publication Data
US 2023/0059885 A1    Feb. 23, 2023

(30) Foreign Application Priority Data
Apr. 29, 2020    (CN) .......................... 202010354165.4

(51) Int. Cl.
*D01F 6/74* (2006.01)
*C08G 73/10* (2006.01)
*D01D 5/00* (2006.01)

(52) U.S. Cl.
CPC .......... *D01F 6/74* (2013.01); *C08G 73/1078* (2013.01); *D01D 5/003* (2013.01); *D01D 5/0092* (2013.01)

(58) Field of Classification Search
CPC ... C08G 73/1042; C08G 73/1078; D01F 6/41; D01D 5/003; D01D 5/0092
See application file for complete search history.

(56) References Cited

U.S. PATENT DOCUMENTS

2008/0132667 A1* 6/2008 Makinoshima .... C08G 18/3846
528/355
2016/0168329 A1* 6/2016 Sato ........................ C08J 5/04
524/600

FOREIGN PATENT DOCUMENTS

CN    101456954 A    6/2009
CN    102816327 A    12/2012
(Continued)

OTHER PUBLICATIONS

Machine Translation of CN 108864014A (Year: 2018).*
(Continued)

*Primary Examiner* — Jeremy R Pierce
(74) *Attorney, Agent, or Firm* — Hunton Andrews Kurth LLP

(57) ABSTRACT

The present disclosure discloses a high-whiteness polyimide microfiber and a preparation method thereof and use. The polyimide fiber includes polyimide obtained from the reaction of wholly alicyclic dianhydride HTDA and an aromatic diamine monomer containing methyl or trifluoromethyl by chemical imidization. In the present disclosure, the polyimide microfiber has both excellent heat-resistant stability and spinning film-forming property, and the fabric has ultra-high whiteness. The microfiber fabric prepared from the polyimide fiber may be used as a component with high-temperature resistant and high-whiteness in personal protective equip-
(Continued)

ment such as mask and protective clothing, and also may be used as an electronic component in the high-tech field such as aerospace, optoelectronic, microelectronic and automobile.

6 Claims, 6 Drawing Sheets

(56) References Cited

FOREIGN PATENT DOCUMENTS

| | | | |
|---|---|---|---|
| CN | 102911359 A | * | 2/2013 |
| CN | 107501551 A | | 12/2017 |
| CN | 107501552 A | | 12/2017 |
| CN | 108864014 A | | 11/2018 |
| CN | 109575285 A | | 4/2019 |
| CN | 110845730 A | | 2/2020 |
| CN | 111501125 A | | 8/2020 |
| JP | 2003-322860 A | | 11/2003 |
| WO | 2010085121 A2 | | 7/2010 |

OTHER PUBLICATIONS

English translation to CN-102911359-A to Chen et al. (Year: 2013).*
First Chinese Office Action dated Dec. 3, 2020 for Chinese patent application No. 202010354165.4.

* cited by examiner

HIGH-WHITENESS POLYIMIDE MICROFIBER AND PREPARATION METHOD THEREOF AND USE

CROSS REFERENCE TO RELATED APPLICATION

This patent application claims the benefit and priority of the Chinese patent application No. 202010354165.4 filed on Apr. 29, 2020, titled "High-whiteness polyimide microfiber and preparation method thereof and use", the disclosure of which is incorporated by reference herein in its entirety as part of the present application.

TECHNICAL FIELD

The present disclosure relates to the field of functional fiber materials, and in particular to a high-whiteness polyimide microfiber and a preparation method thereof and use.

BACKGROUND ART

In terms of colors, white is the most popular color in current industrial products, and high-whiteness polymer fiber fabrics are becoming more and more popular in modern industry. Furthermore, high-whiteness components usually may improve the efficiency of functional devices. For example, the addition of high-whiteness coatings usually provide the characteristics of high reflectivity and scattering, being very beneficial to improve the optical efficiency and quality of illumination systems. In the prior art, the whiteness and opacity of materials are often improved by adding mineral fillers, such as titanium dioxide, kaolin, calcium carbonate, or organic fluorescent whitening agent. In this case, in order to obtain sufficient whiteness, the contents of added pigments are often very large, which affects the mechanical property of the material; meanwhile, the compatibility between the mineral filler and polymer is usually poor, as a result, necessary treatments are required before use, and additional production processes increase the cost of the material; moreover, there are potential environmental pollution and harm to human health. On the other hand, the existing intrinsic high-whiteness fiber materials, such as cotton fiber, polyvinyl alcohol fiber and polyethylene fiber, have poor temperature resistance and cannot meet the application requirements of the high-tech field. Therefore, it is very necessary to research and develop the intrinsic high-temperature resistant and high-whiteness of materials.

In recent years, polyimide (PI) microfiber fabrics have been widely used in many fields such as high-temperature dust filter material, electrical insulating material, various high-temperature resistant flame-retardant protective clothing, parachute, heat-sealing material, composite reinforcing agent and radiation-resistant material, due to its excellent comprehensive performance. However, due to the strong conjugation between molecules, the colors of traditional wholly aromatic PI fabric products are usually darker.

SUMMARY

The first object of the present disclosure is to provide a high-whiteness PI microfiber. The microfiber overcomes the defect that a fabric shows a dark color from dark brown to yellow caused by the strong conjugation interactions of intramolecular and intermolecular in chains in the existing PI spinning technologies. The present disclosure provides a soluble PI microfiber with good comprehensive performance and high-whiteness.

In order to realize the above object, the present disclosure provides the following technical solutions:

The present disclosure provides a polyimide resin, comprising polyimide obtained from the reaction of wholly alicyclic dianhydride HTDA (i.e. 3,4-dicarboxyl-1,2,3,4,5,6,7,8-perhydronaphthalene-l-succinic anhydride) and an aromatic diamine monomer by chemical imidization, wherein the aromatic diamine monomer is an aromatic diamine monomer containing methyl or trifluoromethyl.

The present disclosure further provides a method for preparing the polyimide resin, comprising:

1) dissolving an aromatic diamine monomer in an aprotic strong polar solvent to form a homogeneous solution under stirring, adding wholly alicyclic dianhydride HTDA, and subjecting the mixture to a reaction to obtain a poly amic acid PAA solution, and in this step, the aromatic diamine monomer is an aromatic diamine monomer containing methyl or trifluoromethyl;

2) adding acetic anhydride and pyridine into the poly amic acid (i.e. PAA) solution, and subjecting the mixed solution to a reaction to obtain a soluble polyimide solution; and 3) precipitating the soluble polyimide solution into absolute ethanol to obtain the polyimide resin.

The present disclosure provides a soluble PI microfiber, i.e. a polyimide fiber, comprising polyimide obtained from the reaction of wholly alicyclic dianhydride HTDA and an aromatic diamine monomer by chemical imidization, wherein the aromatic diamine monomer is an aromatic diamine monomer containing methyl or trifluoromethyl.

In one embodiment, the aromatic diamine monomer containing methyl or trifluoromethyl is 2,2'-dimethyl-4,4'-diaminobenzidine (DMBZ) or 4,4'-diamino-2,2'-bis(trifluoromethyl)benzidine (TFMB).

In one embodiment, the polyimide has a compound with a structural general formula represented by Formula I:

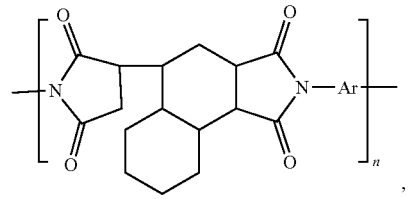

Formula I in the structural general formula represented by Formula I, —Ar— represents as

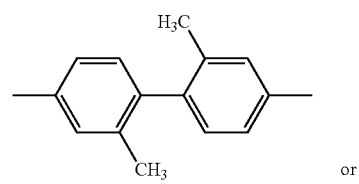

or

-continued

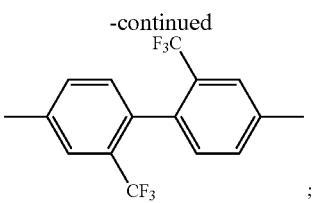

and
n is an integer in a range of 1-200.

In one embodiment, —Ar— represents as

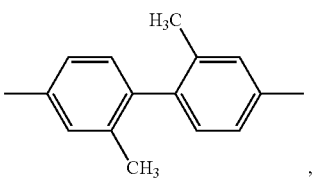

and
n is an integer in a range of 10-100, that is, the polyimide fiber obtained from the reaction of wholly alicyclic dianhydride HTDA and an aromatic diamine monomer by chemical imidization is more preferred solution in the present disclosure. The polyimide fiber prepared with this structure has a high molecular weight, good performance and high-whiteness.

In the present disclosure, the polyimide fiber is a high-whiteness polyimide microfiber, which can not only be dissolved in a polar aprotic solvent, but also has good solubility in conventional solvents, including but not limited to, chloroform, tetrahydrofuran, cyclopentanone, cyclohexanone and methyl isobutyl ketone.

The second object of the present disclosure is to provide a method for preparing the polyimide fiber. In the preparation method of the present disclosure, wholly alicyclic dianhydride HTDA and an aromatic diamine monomer containing methyl or trifluoromethyl are used as raw materials to prepare the polyimide fiber by chemical imidization. The preparation method is easy to operate and efficient, and the final product has a high yield.

In the present disclosure, a method for preparing the polyimide fiber comprises:

1) dissolving an aromatic diamine monomer in an aprotic strong polar solvent to form a homogeneous solution under stirring, adding wholly alicyclic dianhydride HTDA, and subjecting the mixture to a reaction to obtain a poly amic acid (PAA) solution, and in this step, the aromatic diamine monomer is an aromatic diamine monomer containing methyl or trifluoromethyl;

2) adding acetic anhydride and pyridine into the PAA solution, and subjecting the mixed solution to a reaction to obtain a soluble polyimide solution;

3) precipitating the soluble polyimide solution into absolute ethanol to obtain a polyimide resin; and 4) dissolving the polyimide resin in an organic solvent to obtain a polyimide solution, and obtaining the high-whiteness polyimide microfiber at a voltage of 12-20 kV by electrostatic spinning technology. In the present disclosure, the obtained polyimide fiber is also a high-whiteness polyimide microfiber (i.e. a high-whiteness PI microfiber).

In one embodiment, a molar ratio of the aromatic diamine monomer to wholly alicyclic dianhydride HTDA is in a range of (0.95-1.02):(1.02-0.95), and more preferably (0.98-1.01):1.

In one embodiment, the aromatic diamine monomer is an aromatic diamine monomer containing methyl, and more preferably 2,2'-dimethyl-4,4'-diaminobenzidine (DMBZ).

In one embodiment, the aprotic strong polar solvent is at least one selected from the group consisting of N-methylpyrrolidone (NMP), m-cresol, N,N-dimethylformamide (DMF), N,N-dimethylacetamide (DMAc), dimethyl sulfoxide (DMSO) and γ-butyrolactone, and more preferably N,N-dimethylacetamide.

In one embodiment, in step 1), the dosage of the aprotic strong polar solvent is to make the mass percentage content of solid in the reaction system in a range of 10%-30%, and more preferably 15%-25%.

In one embodiment, in step 1), the reaction is conducted at a temperature of 0-30° C., and the reaction is conducted for 10-48 hours, and more preferably, the reaction is conducted at a temperature of 10-25° C., and the reaction is conducted for 18-24 hours.

In one embodiment, in step 2), a molar ratio of wholly alicyclic dianhydride HTDA, acetic anhydride and pyridine is in a range of 1:(3-20):(2-16), and more preferably 1:(5-10):(4-8).

In one embodiment, in step 2), the reaction is conducted at a temperature of 0-25° C., and the reaction is conducted for 10-48 hours, and more preferably, the reaction is conducted at a temperature of 15-25° C., and the reaction is conducted for 12-24 hours.

In the present disclosure, both step 1) and step 2) are conducted in a nitrogen atmosphere.

In one embodiment, in step 4), the solid content of the polyimide solution is in a range of 15 wt %-40 wt %.

In one embodiment, in step 4), the organic solvent may be an organic solvent commonly used in the art, and more preferably is at least one selected from the group consisting of N-methylpyrrolidone (NMP), N,N-dimethylacetamide (DMAc), dimethyl sulfoxide (DMSO) and N,N-dimethylformamide (DMF), and most preferably N,N-dimethylacetamide (DMAc).

In one embodiment, in order to ensure the mechanical property of the fiber while improving the whiteness of the fiber, in step 4), the parameters of the electrostatic spinning technology are as follows: an inner diameter of a spinning nozzle in a range of 0.21-0.50 mm; an applied voltage in a range of 12-20 kV; an injection speed in a range of 0.1 mL/h; a distance between a spinneret plate and a receiving device in a range of 10-20 cm; and a relative humidity of 30±10%. Wherein, the applied voltage is preferably in a range of 15-18 kV.

In the present disclosure, the preparation method further preferably comprises: subjecting the polyimide microfiber obtained to a heat treatment at a temperature of 180-200° C. by electrostatic spinning technology to obtain the polyimide microfiber fabric, wherein the heat treatment is preferably conducted for 0.5-5 hours, and more preferably 1-3 hours.

Another object of the present disclosure is to provide use of the polyimide resin, the polyimide resin obtained by the preparation method, the polyimide fiber or the polyimide fiber obtained by the preparation method in personal protective equipment, microelectronic, optoelectronic or wearable electronic product.

In the present disclosure, polyimide has good solubility, and the polyimide microfiber prepared from polyimide has excellent heat-resistant stability, spinning film-forming property and ultrahigh whiteness. The polyimide microfiber fabric may be used as an electronic component in the high-tech field such as aerospace, optoelectronic, microelectronic and automobile.

DETAILED DESCRIPTION OF THE EMBODIMENTS

Figure 1:
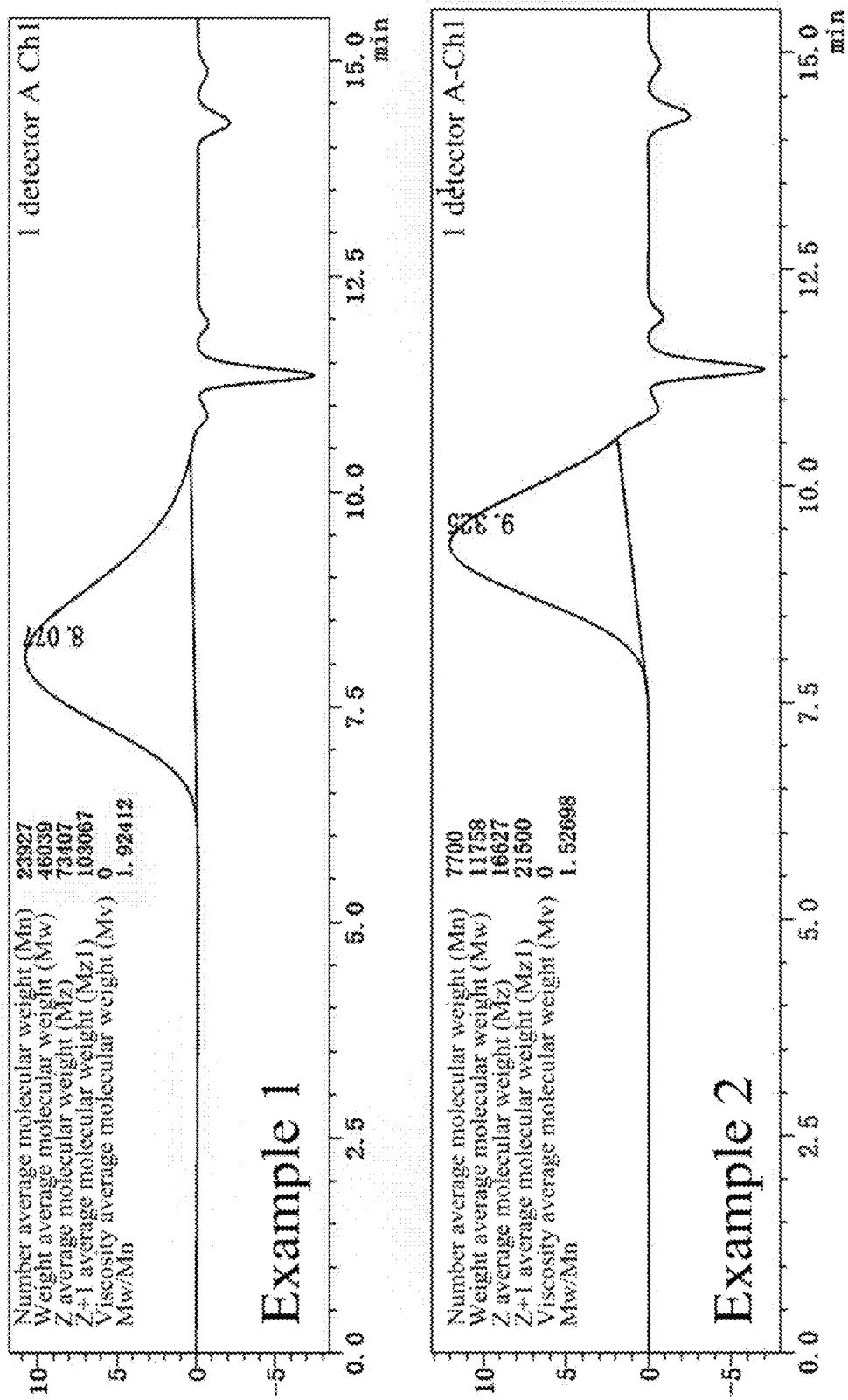
FIG. 1 is a gel permeation chromatography (GPC) diagram of the PI resins prepared in Examples 1-2.

The present disclosure will be further described in detail below with reference to the examples. The following examples are intended to illustrate the present disclosure, rather than limiting the scope of the present disclosure.

Unless otherwise specified, the methods are all conventional methods. Unless otherwise specified, the materials may be obtained from open commercial approaches.

A method for evaluating the property of the PI resins and PI microfiber fabrics obtained in the following examples was performed as follows:

The molecular weight of the PI resin:

Gel permeation chromatography (GPC): the prepared PI resin was tested by a LC-20AD high performance liquid chromatography manufactured by Shimadzu corporation, in Japan, wherein N-methylpyrrolidone (NMP) was used as a mobile phase. The obtained molecular weights were all number average molecular weights.

A method for evaluating the micro-morphology of PI microfiber fabrics was performed as follows:

Scanning electron microscope (SEM): the prepared PI microfiber fabric was tested on a JSM-IT300 series scanning electron microscope manufactured by JEOL, in Japan, with an accelerating voltage in a range of 5-20 KV.

A method for evaluating the thermal decomposition temperature of PI microfiber fabrics was performed as follows:

Thermogravimetric analysis (TGA): the prepared PI microfiber fabric was tested on a STA8000 thermogravimetric analyzer manufactured by PerkinElmer, in USA, with a heating rate of 10° C./min in a nitrogen atmosphere.

A method for evaluating the whiteness of PI microfiber fabrics was performed as follows:

Ultraviolet-visible reflectance spectrum (UV-Vis): the prepared PI microfiber fabric was tested on a U-3900 model ultraviolet spectrophotometer manufactured by HITACHI, in Japan, wherein, the wavelength was in a range of 200-800 nm. R457 was defined as the reflectivity of a sample at 457 nm.

Whiteness index (WI): the prepared PI microfiber fabric was tested on a X-rite color i7 spectrophotometer, and color parameters were calculated according to the CIE Lab equation, wherein L* represented as brightness, 100 represented as white, and 0 represented as black; and positive a* represented as red, and negative a* represented as green. Positive b* represented yellow, and negative b* represented as blue. The whiteness index WI was calculated according to the Chinese standard GB/T 17644-2008.

Example 1: The Preparation of Soluble PI Microfiber from HTDA and DMBZ

In a 250 mL three-necked flask equipped with a mechanical agitation, a thermometer and a nitrogen inlet, DMBZ (4.2458 g, 0.02 mol) was dissolved in newly distilled DMAc (25.1160 g), obtaining a clear diamine solution. HTDA (6.1262 g, 0.02 mol) was added into the clear diamine solution, and then another volume of residual dianhydride from the washing of DMAc (6 g) was added thereto, and meanwhile the solid content of the reaction system was adjusted to 25 wt %. The reaction system was stirred under nitrogen at 25° C. for 24 hours, obtaining a poly amic acid (PAA) solution, and a mixture of acetic anhydride (10.209 g, 0.1 mol) and pyridine (6.328 g, 0.08 mol) was added thereto, obtaining a reaction mixture. The reaction mixture was stirred at 25° C. for 24 hours. The resultant viscous solution was slowly poured into excessive ethanol, obtaining a white fibrous resin. The PI resin had a structure represented by:

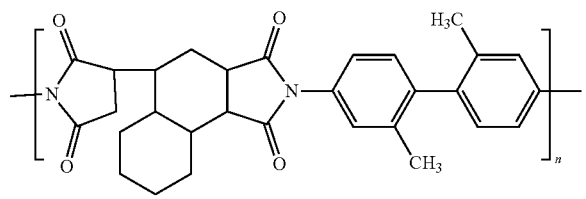

The molecular weight of the compound was shown in FIG. 1, with a number average molecular weight of 23,927 and a weight average molecular weight of 46,039; and n=50.

The polyimide resin was dissolved in N,N-dimethylacetamide (DMAc) to prepare a solution with a solid content of 40 wt %, and the dissolved solution was subjected to an electrostatic spinning. Spinning parameters were as follows: an inner diameter of a spinning nozzle of 0.50 mm; an applied voltage of 15 kV; an injection speed of 0.1 mL/h; a distance between a spinneret plate and a receiving device of 15 cm; and a relative humidity of 30±10%. The obtained fabric was dried at 200° C. for 3 h to remove the residual solvent from the obtained fabric.

The thermal decomposition temperature (i.e. weight loss temperature of 5%) of the microfiber fabric=444.8° C. The whiteness index WI=91.43. The optical properties were shown in Table 1.

The molecular weight test was shown in FIG. 1.

Figure 2:
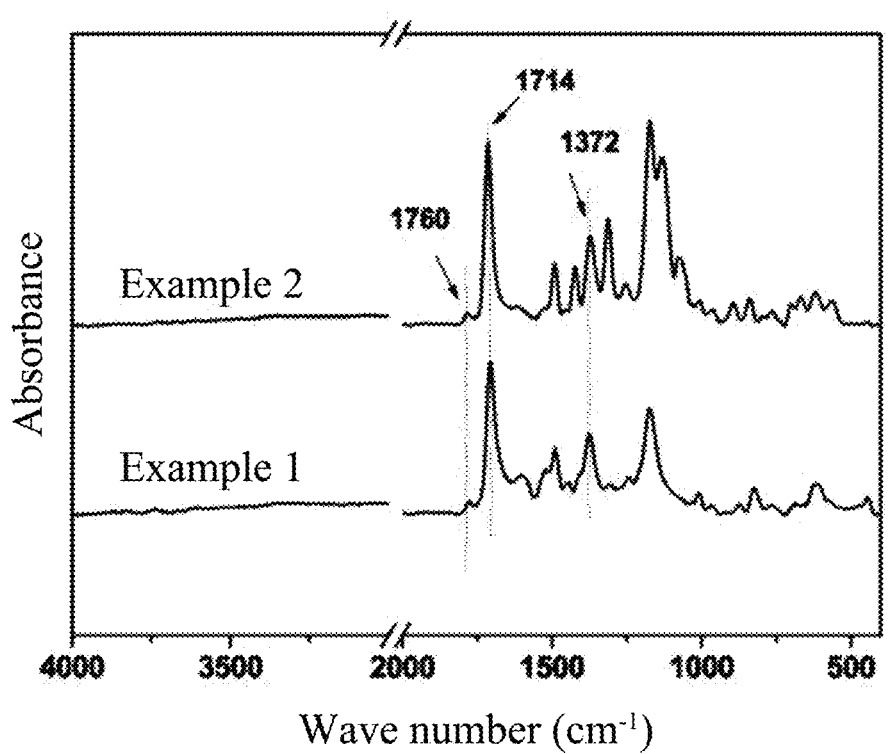
FIG. 2 is an Fourier transform infrared spectroscopy (FT-IR) spectrum of the PI microfiber fabrics prepared in Examples 1-2.

The FT-IR spectrum test was shown in FIG. 2.

Figure 3:
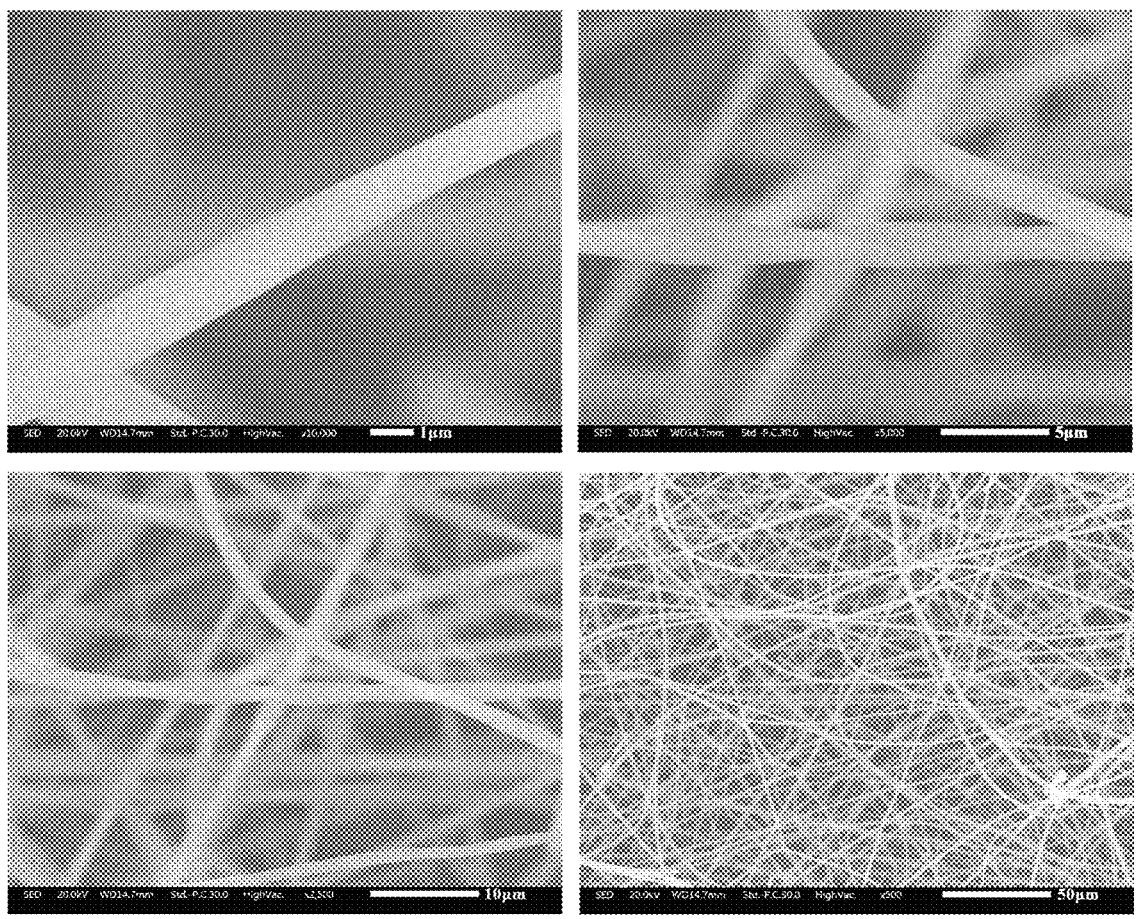
FIG. 3 is a scanning electron microscope (SEM) image of the PI microfiber fabric prepared in Example 1.

The scanning electron microscope test was shown in FIG. 3.

Figure 4:
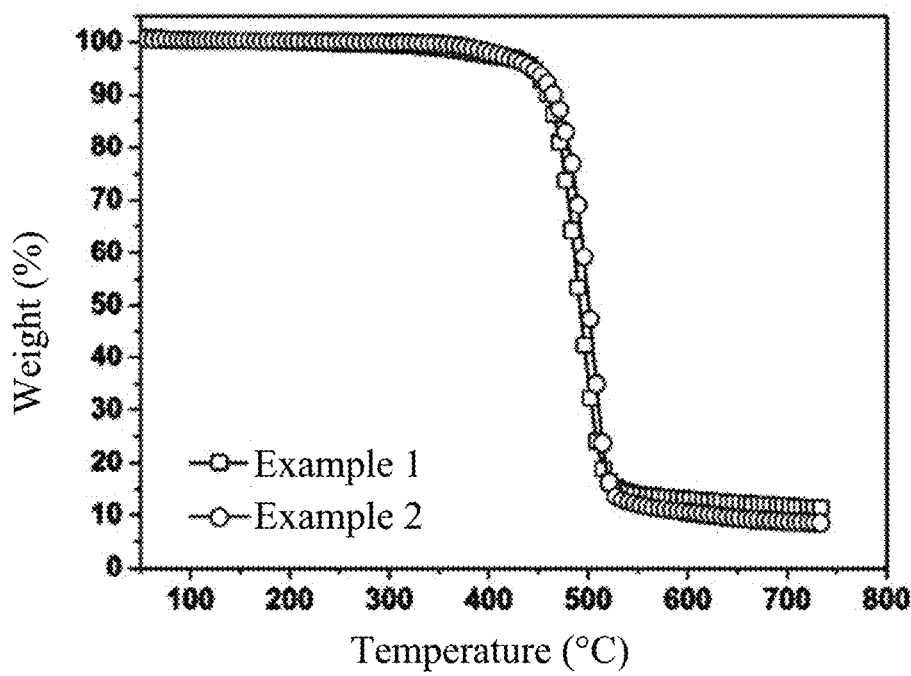
FIG. 4 is a TGA spectrogram of the PI microfiber fabrics prepared in Examples 1-2.

TGA spectrogram was shown in FIG. 4.

Figure 5:
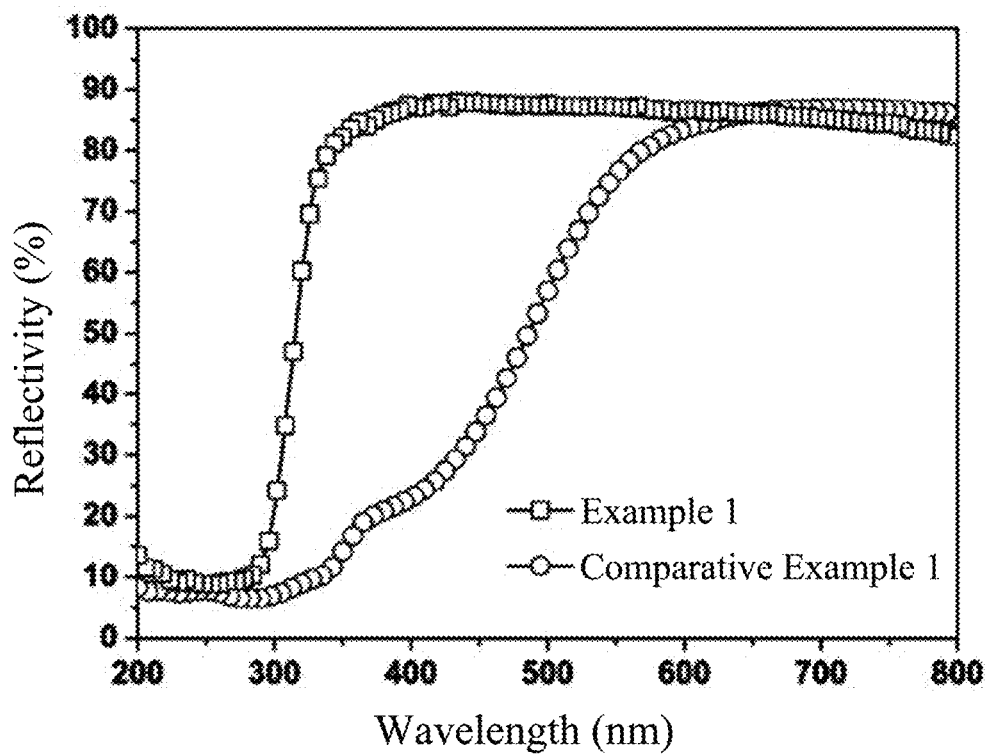
FIG. 5 is an ultraviolet-visible (UV-Vis) spectrum of the PI microfiber fabrics prepared in Example 1 and Comparative Example 1.

The ultraviolet-visible spectrum was shown in FIG. 5.

Figure 6:
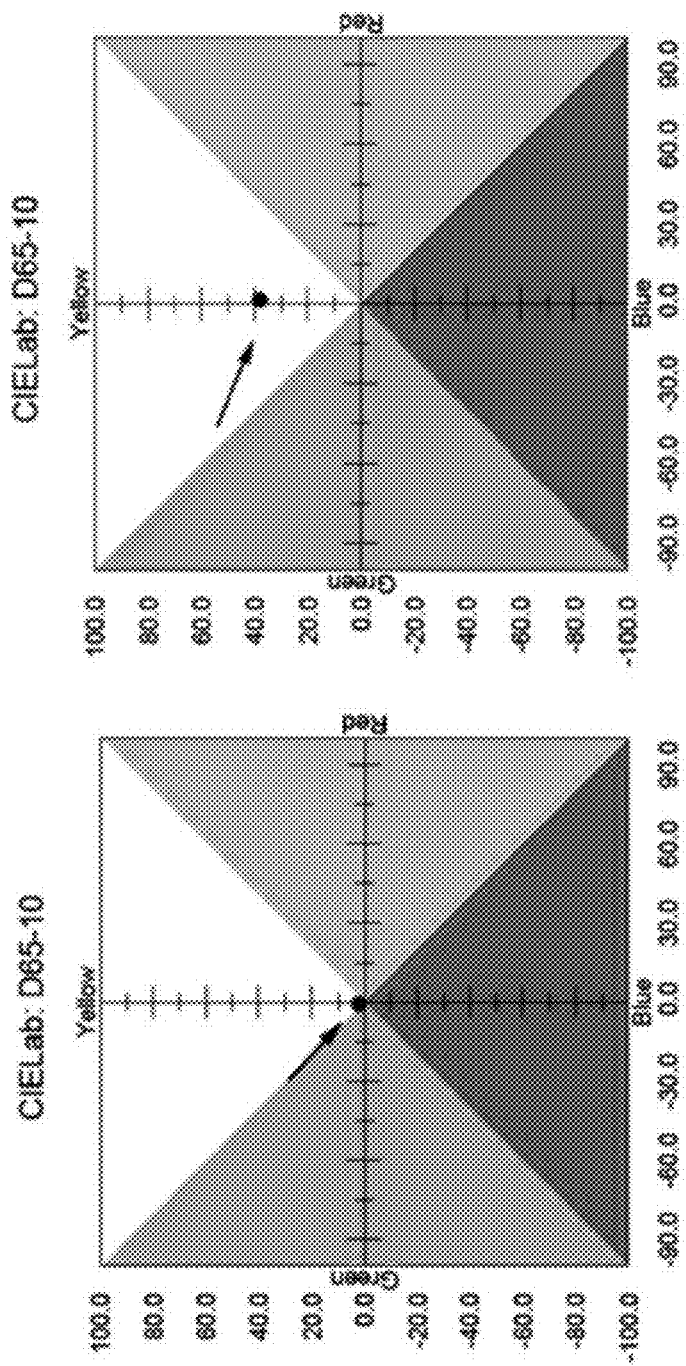
FIG. 6 is a chromaticity coordinate diagram of the PI microfiber fabrics prepared in Example 1 and Comparative Example 1.

The chromaticity coordinate diagram was shown in FIG. 6.

Example 2: The Preparation of Soluble PI Microfiber from HTDA and TFMB

In a 250 mL three-necked flask equipped with a mechanical stirring, a thermometer and a nitrogen inlet, TFMB (6.4046 g, 0.02 mol) was dissolved in newly distilled DMAc (30.5924 g), obtaining a clear diamine solution. HTDA (6.1262 g, 0.02 mol) was added into the clear diamine solution, and then another volume of residual dianhydride from the washing of DMAc (7 g) was added thereto, and meanwhile the solid content of the reaction system was adjusted to 25 wt %. The reaction system was stirred under nitrogen at room temperature for 24 hours, and then a mixture of acetic anhydride (10.209 g, 0.1 mol) and pyridine (6.328 g, 0.08 mol) was added thereto, obtaining a reaction mixture. The reaction mixture was stirred at room temperature for 24 hours. The resultant viscous solution was slowly poured into an excessive ethanol aqueous solution, obtaining a white fibrous resin. The PI resin had a structure represented by:

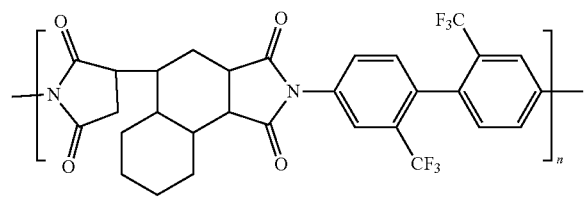

The molecular weight of the compound was shown in FIG. 1, with a number average molecular weight of 7700 and a weight average molecular weight of 11758; and n=12.

The polyimide resin was dissolved in N,N-dimethylacetamide (DMAc) to prepare a solution with a solid content of 50 wt %, and the dissolved solution was subjected to an electrostatic spinning. Spinning parameters were as follows: an inner diameter of a spinning nozzle of 0.50 mm; an applied voltage of 15 kV; an injection speed of 0.1 mL/h; a distance between a spinneret plate and a receiving device of 15 cm; and a relative humidity of 30±10%. The obtained fabric was dried at 200° C. for 3 h to remove the residual solvent from the obtained fabric.

The thermal decomposition temperature (i.e. weight loss temperature of 5%) of the microfiber fabric=443.8° C. The whiteness index WI=92.01. The optical properties were shown in Table 1.

The molecular weight was shown in FIG. 1.

The infrared spectrum was shown in FIG. 2.

The TGA spectrogram was shown in FIG. 4.

Example 3: The Preparation of Soluble PI Microfiber from HTDA and DMBZ

In a 250 mL three-necked flask equipped with a mechanical stirring, a thermometer and a nitrogen inlet, DMBZ (4.2458 g, 0.02 mol) was dissolved in newly distilled DMAC (25.1160 g), obtaining a clear diamine solution. HTDA (6.5776 g, 0.0215 mol) was added into the clear diamine solution, and then another volume of residual dianhydride from the washing of DMAC was added thereto, and meanwhile the solid content of the reaction system was adjusted to 15 wt %. The reaction system was stirred under nitrogen at 10° C. for 18 hours, and then a mixture of acetic anhydride (21.949 g, 0.215 mol) and pyridine (13.605 g, 0.172 mol) was added thereto, obtaining a reaction mixture. The reaction mixture was stirred at 15° C. for 12 hours. The resultant viscous solution was slowly poured into excessive ethanol, obtaining a white fibrous resin. The PI resin had a structure represented by:

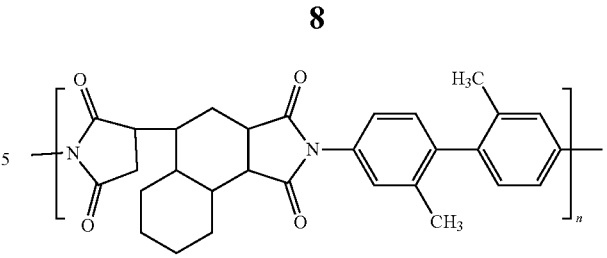

The compound had a number average molecular weight of 21086 and a weight average molecular weight of 44291; and n=44.

The polyimide resin was dissolved in N,N-dimethylacetamide (DMAc) to prepare a solution with a solid content of 15 wt %, and the dissolved solution was subjected to an electrostatic spinning. Spinning parameters were as follows: an inner diameter of a spinning nozzle of 0.21 mm; an applied voltage of 18 kV; an injection speed of 0.1 mL/h; a distance between a spinneret plate and a receiving device of 10 cm; and a relative humidity of 30±10%. The obtained fabric was dried at 200° C. for 3 h to remove the residual solvent from the obtained fabric.

The thermal decomposition temperature (i.e. weight loss temperature of 5%) of the microfiber fabric=443.3° C. The whiteness index WI=90.73. The optical properties were shown in Table 1.

Example 4: The Preparation of Soluble PI Microfiber from HTDA and DMBZ

In a 250 mL three-necked flask equipped with a mechanical stirring, a thermometer and a nitrogen inlet, DMBZ (4.2458 g, 0.02 mol) was dissolved in newly distilled DMAc (25.1160 g), obtaining a clear diamine solution. HTDA (5.697 g, 0.0186 mol) was added into the clear diamine solution, and then another volume of residual dianhydride from the washing of DMAC was added thereto, and meanwhile the solid content of the reaction system was adjusted to 30 wt %. The reaction system was stirred under nitrogen at 30° C. for 10 hours, and then a mixture of acetic anhydride (5.697 g, 0.0558 mol) and pyridine (2.94 g, 0.0372 mol) was added thereto, obtaining a reaction mixture. The reaction mixture was stirred at 0° C. for 48 hours. The resultant viscous solution was slowly poured into excessive ethanol, obtaining a white fibrous resin. The PI resin had a structure represented by:

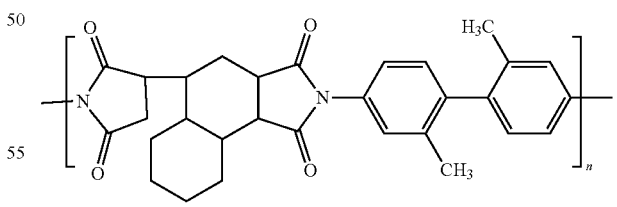

The compound had a number average molecular weight of 20337 and a weight average molecular weight of 43864; and n=42.

The polyimide resin was dissolved in N,N-dimethylacetamide (DMAC) to prepare a solution with a solid content of 10 wt %, and the dissolved solution was subjected to an electrostatic spinning. Spinning parameters were as follows: an inner diameter of a spinning nozzle of 0.21 mm; an applied voltage of 12 kV; an injection speed of 0.1 mL/h; a distance between a spinneret plate and a receiving device of 20 cm; and a relative humidity of 30±10%. The obtained fabric was dried at 200° C. for 3 h to remove the residual solvent from the obtained fabric.

The thermal decomposition temperature ((i.e. weight loss temperature 5%) of the microfiber fabric=442.6° C. The whiteness index WI=89.66 The optical properties were shown in Table 1.

Comparative Example 1: The Preparation of Soluble PI Microfiber from PMDA and ODA In a 250 mL three-necked flask equipped with a mechanical stirring, a thermometer and a nitrogen inlet, ODA (2.0024 g, 0.01 mol) was dissolved in newly distilled DMAc (30.6524 g), obtaining a clear diamine solution. PMDA (2.1812 g, 0.01 mol) was added into the clear diamine solution, and then another volume of residual dianhydride from the washing of DMAc (7 g) was added thereto, and meanwhile the solid content of the reaction system was adjusted to 10 wt %. The reaction system was stirred under nitrogen at room temperature for 5 hours, obtaining a poly amic acid solution.

The poly amic acid solution was diluted in N,N-dimethylacetamide (DMAc) to prepare a solution with a solid content of 8 wt %, and the dissolved solution was subjected to an electrostatic spinning. Spinning parameters were as follows: an inner diameter of a spinning nozzle of 0.50 mm; an applied voltage of 15 kV; an injection speed of 0.1 mL/h; a distance between a spinneret plate and a receiving device of 15 cm; and a relative humidity of 30±10%. The obtained fabric was treated at 300° C. for 1 h to obtain the PI microfiber fabric. The PI fabric had a structure represented by:

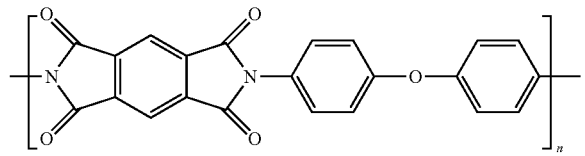

The whiteness index WI of the microfiber fabric=59.02.
The ultraviolet-visible spectrum was shown in FIG. 5.
The chromaticity coordinate diagram was shown in FIG. 6. The optical properties were shown in Table 1.

Comparative Example 2 The Preparation of High-Whiteness Superfine Fiber Fabric from Polystyrene Commercially available polystyrene (PS) was dissolved in N,N-dimethylacetamide (DMAc) to prepare a solution with a solid content of 25 wt %, and the dissolved solution was subjected to an electrostatic spinning. Spinning parameters were as follows: an inner diameter of a spinning nozzle of 0.50 mm; an applied voltage of 15 kV; an injection speed of 0.1 mL/h; a distance between a spinneret plate and a receiving device of 15 cm; and a relative humidity of 30±10%. The PS fabric had a structure represented by:

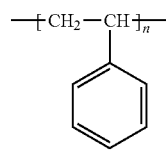

The whiteness index WI of the microfiber fabric=93.26. The optical properties were shown in Table 1.

The obtained PS microfiber fabric and the PI microfiber fabric with the same size (20 mm×30 mm) in Examples were placed side by side under an UV-LED surface light source for ultraviolet irradiation for 3 h, wherein the microfiber fabric was 7 cm away from the surface light source, and the irradiation energy was 2670 J/cm².

Figure 7:
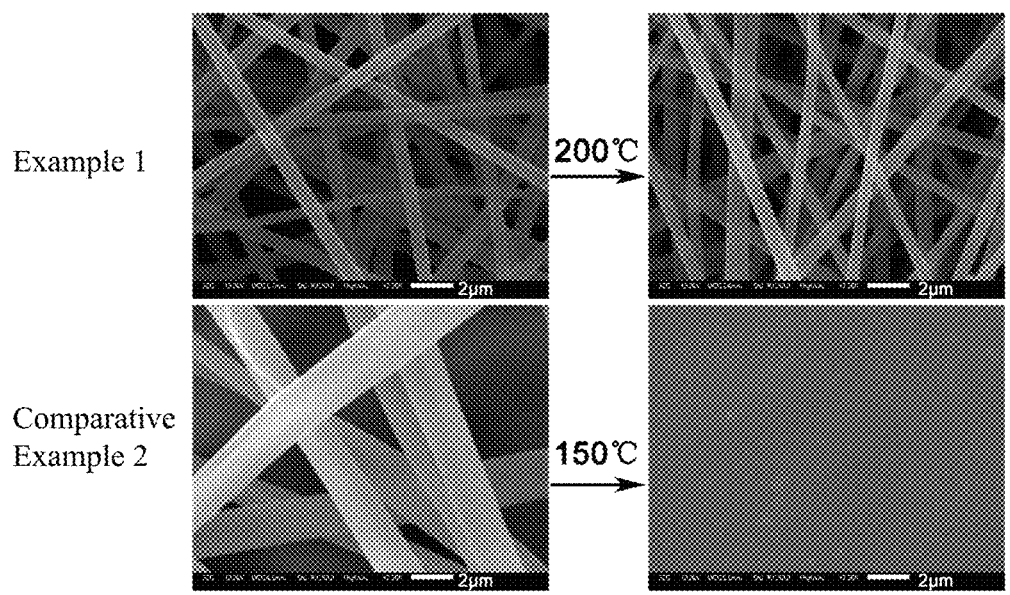
FIG. 7 is an SEM image showing PI prepared in Example 1 and the polystyrene (PS) microfiber fabric prepared in Comparative Example 2 after a high-temperature treatment.

The obtained PS and the PI microfiber fabric (10 mm×30 mm) obtained in Example 1 were respectively treated in environments of 50° C., 100° C., 150° C. and 200° C. for 1 h. The SEM image of the microfiber fabric before and after a high-temperature treatment was shown in FIG. 7.

TABLE 1

Properties of the polyimide resins and microfiber fabrics.

| Examples | Number Average Molecular Weight (g/mol) | Weight loss temperature of 5% (° C.) | Optical Property | | | | |
|---|---|---|---|---|---|---|---|
| | | | $R_{457}$ | L* | a* | b* | WI |
| Example 1 | 23927 | 444.8 | 87.7 | 91.69 | −0.48 | 2.02 | 91.43 |
| Example 2 | 7700 | 443.8 | 89.8 | 92.24 | −0.26 | 1.86 | 92.01 |
| Example 3 | 21086 | 443.3 | 87.3 | 90.73 | −0.49 | 2.11 | 90.48 |
| Example 4 | 20337 | 442.6 | 87.1 | 89.66 | −0.50 | 2.14 | 89.43 |
| Comparative Example 1 | — | — | 37.3 | 84.65 | 1.62 | 37.96 | 59.02 |
| Comparative Example 2 | — | 333.6 | 86.4 | 93.52 | −0.49 | 1.78 | 93.26 |

It can be seen from the summarizing of the data in Table 1 that the PI film prepared in Example 1 has excellent comprehensive properties, including a high number average molecular weight, a higher weight loss temperature of 5% and a good spinning film-forming property, and the microfiber fabric prepared from the PI film has a flat appearance and a good mechanical property. The microfiber fabric in Example 2 has a lower molecular weight and a slightly poorer spinning film-forming property. The microfiber fabric in Comparative Example 1 is a traditional wholly aromatic PI, having a strong conjugation between molecules, and being presented with a deeper yellow color. The interaction between polystyrene molecules in Comparative Example 2 was weaker than PI, and the microfiber fabric was presented with the highest whiteness. However, because the molecular structure did not contain a heterocyclic structure, the heat-resistant stability and ultraviolet radiation resistance of PS were poorer,. Therefore, the whiteness index of the PS microfiber fabric decreased obviously after ultraviolet radiation, and the structure of the PS fiber was completely disappeared and the high whiteness property was lost after a high-temperature treatment at 150° C. In Example 1, during the process of ultraviolet irradiation and high-temperature treatment, the fiber structure showed an excellent stability, and the whiteness index was basically unchanged.

Therefore, in the present disclosure, the high-whiteness microfiber fabric prepared by using wholly alicyclic dianhydride HTDA and a diamine containing —CH₃ has the best comprehensive property. After hydrogen in methyl in the high-whiteness microfiber fabric is replaced by fluorine, the comprehensive property is slightly poorer, however, the replaced high-whiteness microfiber fabric still has a good property and an ultra-high whiteness, and the comprehensive property of it is better than that of the polyimide fiber fabrics in the prior art. This example has a good industrialization prospect.

The description of the above embodiments is only for helping to understand the method and the core idea of the present disclosure. It should be noted that, without departing from the principle of the present disclosure, several improvements and modifications may be made by those skilled in the art, and these improvements and modifications should also fall within the protection scope of the claims of the present disclosure. Various modifications to these embodiments are obvious to those skilled in the art, and the general principles defined herein may be implemented in other embodiments without departing from the spirit or scope of the present disclosure. Thus, the present disclosure will not be limited to the embodiments shown herein, but should conform to the widest scope consistent with the principles and novel features disclosed herein.

What is claimed is:

1. A polyimide fiber, comprising polyimide obtained from a reaction of wholly alicyclic dianhydride HTDA and an aromatic diamine monomer by chemical imidization,
wherein the aromatic diamine monomer is an aromatic diamine monomer containing methyl or trifluoromethyl,
wherein the polyimide has a compound with a structural general formula represented by a Formula I:

Formula I

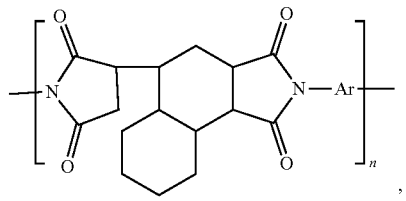

in the structural general formula represented by the Formula I, —Ar— is represented as

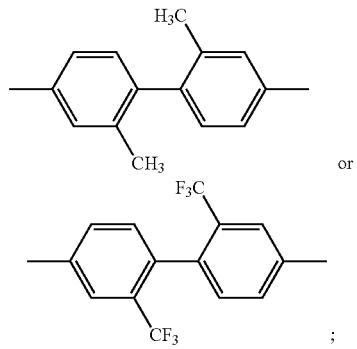

and
n is an integer in a range of 1-200.

2. The polyimide fiber of claim 1, wherein —Ar— is represented as

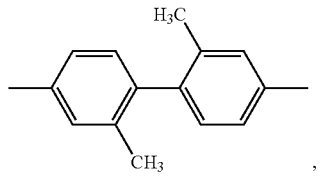

and
n is an integer in a range of 10-100.

3. The polyimide fiber of claim 1, wherein the aromatic diamine monomer is 2,2'-dimethyl-4,4'-diaminobenzidine or 4,4'-diamino-2,2'-bis(trifluoromethyl)benzidine.

4. A polyimide fiber, comprising polyimide obtained from a reaction of wholly alicyclic dianhydride HTDA and an aromatic diamine monomer by chemical imidization, wherein the aromatic diamine monomer is 2,2'-dimethyl-4,4'-diaminobenzidine or 4,4'-diamino-2,2'-bis(trifluoromethyl)benzidine.

5. A method for using the polyimide fiber of claim 1, wherein the polyimide fiber is used in producing personal protective equipment, microelectronic, optoelectronic or wearable electronic product.

6. The method of claim 5, wherein the polyimide fiber is prepared by a method comprising:
1) dissolving an aromatic diamine monomer in an aprotic strong polar solvent to form a homogeneous solution under stirring, adding wholly alicyclic dianhydride HTDA, and subjecting the solution to a reaction to obtain a poly amic acid PAA solution, and in this step, the aromatic diamine monomer is an aromatic diamine monomer containing methyl or trifluoromethyl;
2) adding acetic anhydride and pyridine into the poly amic acid PAA solution, and subjecting the mixed solution to a reaction to obtain a soluble polyimide solution;
3) precipitating the soluble polyimide solution into absolute ethanol to obtain a polyimide resin; and
4) dissolving the polyimide resin in an organic solvent to obtain a polyimide solution, and obtaining the polyimide fiber at a voltage of 12-20 kV by electrostatic spinning technology;
wherein in step 1), the reaction is conducted at a temperature of 0-30° C., and the reaction is conducted for 10-48 hours;
wherein in step 2), the reaction is conducted at a temperature of 0-25° C., and the reaction is conducted for 10-48 hours; and
wherein in step 4), the organic solvent is at least one selected from the group consisting of N-methylpyrrolidone, N,N-dimethylacetamide, dimethyl sulfoxide and N,N-dimethylformamide.

* * * * *